United States Patent Office 3,630,966
Patented Dec. 28, 1971

3,630,966
PREPARATION OF SHAPED SELECTIVE TRANSITION METAL ZEOLITE CATALYST
Nai Yuen Chen, Cherry Hill, and Edward J. Rosinski, Deptford, N.J., assignors to Mobil Oil Corporation
No Drawing. Filed Feb. 25, 1969, Ser. No. 802,220
Int. Cl. B01j 11/58
U.S. Cl. 252—455 Z
7 Claims

ABSTRACT OF THE DISCLOSURE

A method for preparing an improved shape selective catalyst composition from a crystalline aluminosilicate having a silicon to aluminum atomic ratio of at least 1.8 and a pore size of about 5 angstrom units, e.g., an erionite-type zeolite, natural or synthetic, by contacting the same with sulfur or a compound thereof, which contacting can be preceded or followed by aqueous metal exchange or impregnation with a transition metal, and reforming a hydrocarbon charge stock in the presence thereof.

BACKGROUND OF THE INVENTION

(1) Field of the invention

This invention relates to a novel method for preparing a shape selective transition metal exchanged crystalline aluminosilicate and to catalytic reforming in the presence thereof.

(2) Description of the prior art

Zeolitic materials, both natural and synthetic, have been demonstrated in the past to have catalytic capabilities for various types of hydrocarbon conversion. Certain zeolitic materials are ordered, porous crystalline aluminosilicates having a definite crystalline structure within which there are a large number of small cavities which are interconnected by a number of still smaller channels. These cavities and channels are precisely uniform in size. Since the dimensions of these pores are such as to accept for adsorption molecules of certain dimensions while rejecting those of larger dimensions, these materials have come to be known as "molecular sieves" and are utilized in a variety of ways to take advantage of these properties. For example, the concept of shape selective catalytic reactions, e.g., those in which catalytically active surfaces are located within the intra-crystalline volume of substances which act as molecular sieves, and in which the sieve dimensions are in such relation to the chemical species involved in the catalytic reaction that only selected species are allowed to pass the sieve structure, is thoroughly described in U.S. 3,140,322.

Such molecular sieves include a wide variety of positive ion-containing crystalline aluminosilicates, both natural and synthetic. These aluminosilicates can be described as a rigid three-dimensional network of $SiO_4$ and $AlO_4$ in which the tetrahedra are cross-linked by the sharing of oxygen atoms whereby the ratio of the total aluminum and silicon atoms to oxygen is 1:2. The electrovalence of the tetrahedra containing aluminum is balanced by the inclusion in the crystal of a cation, for example, an alkali metal or an alkaline earth metal cation. This can be expressed by formula wherein the ratio of Al to the number of the various cations, such as Ca/2, Sr/2, Na, K, or Li, is equal to unity. One type of cation has been exchanged either in entirety or partially by another type of cation utilizing ion exchange technique in a conventional manner. By means of such cation exchange, it has been possible to vary the size of the pores in the given aluminosilicate by suitable selection of the particular cation. The spaces between the tetrahedra are occupied by molecules of water prior to dehydration.

Prior art techniques have resulted in the formation of a great variety of synthetic crystalline aluminosilicates. These aluminosilicates have come to be designated by letter or other convenient symbol, as illustrated by zeolite A (U.S. 2,882,243), zeolite X (U.S. 2,882,244), zeolite Y (U.S. 3,130,007), zeolite K–G (U.S. 3,055,654), zeolite ZK–5 (U.S. 3,347,195), and zeolite ZK–4 (U.S. 3,314,752), merely to name a few.

The catalytic properties of transition metal-loaded aluminosilicates, as is well known, have been demonstrated to be extremely important to petroleum, chemical and enzymic reactions. The aluminosilicates have been activated, i.e., metal loaded, for these reactions by methods employing impregnation, vapor deposition, and base exchange of the desired metal to be loaded.

One such reaction has been reforming. Reforming operations wherein hydrocarbon fractions such as naphthas, gasolines, and kerosene are treated to improve the antiknock characteristics thereof are well known in the petroleum industry. These fractions are composed predominately of normal and slightly branched paraffinic hydrocarbons and naphthenic hydrocarbons, together with small amounts of aromatic hydrocarbons. During reforming, a multitude of reactions take place including isomerization, dehydrogenation, dehydrocyclization, etc., to yield a product having an increased content of aromatics and highly branched paraffins. Thus, in reforming, it is desired to dehydrogenate the naphthenic hydrocarbons to produce aromatics, to cyclize the straight-chain, paraffinic hydrocarbons to form aromatics, to isomerize the normal and slightly branched paraffins to yield highly branched-chain paraffins to their equilbrium concentrations.

Normal paraffinic hydrocarbons of the type contained in the above fractions have relatively low octane ratings. Branched chain paraffinic hydrocarbons, on the other hand, are characterized by high octane ratings. Accordingly, a new selecto-forming (U.S. Pat. 3,395,094, July 30, 1968) process was developed to selectively converting normal paraffinic to largely propane. Since aromatic hydrocarbons have the high octane ratings of all hydrocarbons, it is also an objective of the selectoforming process to preserve substantially all of the aromatic hydrocarbons present in the charge during the reaction.

However, it has been a problem in the prior art, for reasons not clearly understood, that when using a natural ore as the catalyst source, unexpected ore criticality problems have been encountered. To wit, natural ores of different origin do not yield equally satisfactory catalysts after conventional preparative procedures. One such ore has been the erionite-type ore. This problem is also present in synthetic erionite/offretite-type zeolites. A source of difficulty has been identified as being the presence of excessive exterior, non-shape-selective metal sites which produce unacceptable catalysts when prepared by conventional methods. This unacceptability is characterized by loss of benzene through hydrogenation and hydrogenolytic cracking, loss of shape selectivity through hydrogenolytic cracking, and loss of hydrogen due to high methane production.

SUMMARY OF THE INVENTION

It is, therefore, among one of the principal objectives to provide a method for preparing an effective shape selective transition metal zeolite catalyst regardless of the source of starting material.

In accordance with the present invention, there has now been discovered a method for preparing an improved shape selective reforming catalyst composition from a crystalline aluminosilicate having a silicon to aluminum atomic ratio of at least 1.8 and a pore size of about 5 angstrom units, such as an erionite-type zeolite which comprises contacting the starting material with a material selected from sulfur and compounds thereof, said contacting being preceded or followed by contact with an aqueous exchange solution of a transition metal in cationic form selected from the group consisting of the Group VIII elements of the Periodic Table, and the process of selectively reforming a hydrocarbon charge stock therewith. Alternatively, the transition metal in cationic form can be added by impregnation

DESCRIPTION OF SPECIFIC EMBODIMENTS

As mentioned, the crystalline aluminosilicate starting material employed in the preparation of the subject catalyst composition has a silicon to aluminum atomic ratio of at least 1.8 and a pore size of about 5 angstrom units. Particularly preferred crystalline aluminosilicates include the erionite-type zeolites, either natural or synthetic.

According to one embodiment of the invention, the method for preparing an improved shape-selective reforming catalyst composition comprises contacting an erionite-type crystalline aluminosilicate with elemental sulfur or a compound thereof, e.g., dimethylsulfoxide, and thence subjecting the resultant sulfur-contacted crystalline aluminosilicate to an aqueous exchange solution of a transition metal in cationic form and recovering the final product. The transition metals are those in Group VIII [1] of the Periodic Table, e.g., nickel, platinum, palladium, and the like, but not restricted to the examples given. The concentration of the aqueous cation exchange solution is not critical, the invention residing elsewhere as has been seen. However, the lower the concentration of cation, the more contacts are required, and conversely the higher the concentration the fewer contacts are required. The transition metal can also be added by impregnation.

When the sulfur-treating compound is in the liquid form, e.g., dimethylsulfoxide, the resultant sulfur compound-treated erionite-type starting material should be washed and dried before the aqueous metal exchange step. Of course, when elemental sulfur is used, these steps are not necessary.

The compositions prepared according to the method of the invention are useful for a variety of shape selective hydrogenative and dehydrogenative hydrocracking processes. They are particularly suitable for processes in which the preservation of aromatics is most desirable such as in the shape selective reforming process to selectively hydrocrack the straight chain hydrocarbons.

The range of operating conditions include a pressure of 50–5000 p.s.i., preferably 100–1500 p.s.i., a liquid hourly space velocity (LHSV) of 1–10, a temperature of 700–950° F. and a hydrogen to hydrocarbon ratio ($H_2$/HC) of 1 to 30.

The charge stock may include aromatics, paraffins, and naphthenes and mixtures thereof.

The invention will be further described with reference to the following specific examples.

EXAMPLE 1

(A) Twelve hundred fifty ml. of 3 N $Ni(NO_3)_2 \cdot 6H_2O$ acidified to pH 2 by $HNO_3$ were refluxed in a boiling flask fitted with a reflux condenser. The solution was stirred via a magnetic stirrer. Fifty grams of <60 mesh Nevada erionite (identified as ore lot "D")[2] were added to the boiling solution. The mixture was stirred and refluxed for 60 minutes and filtered while hot, followed by washing with 500 ml. of deionized water (pH adjusted to 2 by $HNO_3$). The catalyst was reslurried with 500 ml. of acidified deionized water and filtered and the step repeated twice with acidified water, once with plain deionized water. Final slurry had a pH of 3.45. The catalyst, designated as D–B contains 3.4 weight percent Ni and was diagnosed as a "bad" catalyst in a diagnostic hydrocracking test (200 p.s.i. pressure, 15/1 molar ratio of $H_2$/HC 4 L.H.S.V., 1:1:2 weight ratio mixture of 2-methylpentane:n-hexane:benzene) as indicated by the 65 percent hydrogenation of benzene at 700° F. and 200 p.s.i. and 90 percent hydrogenolysis of iso-hexane at 900° F. and 200 p.s.i. See Table 3 below.

(B) Twenty (20) grams of natural erionite were subjected to two contacts with 200 milliliters of 5 N ammonium chloride solution at room temperature for two hours and then contacted with another 200 milliliters of 5 N ammonium chloride solution at room temperature overnight. After these exchanges, the mixture was filtered and washed with 500 milliliters of distilled water.

The ammonium erionite thus obtained was added to 500 milliliters of boiling 0.5 N nickel acetate solution. The mixture was stirred and refluxed for ten minutes and filtered while hot, followed by washing with 500 milliliters of distilled water. In this preparation, only one exchange with nickel acetate was used and no nickel hydroxide was deposited. The resulting product analyzed as follows:

|  | Weight percent | Si/Al |
|---|---|---|
| $SiO_2$ | 72.5 | 3.55 |
| $Al_2O_3$ | 17.4 | |
| $Fe_2O_3$ | 2.4 | |
| $K_2$ | 4.1 | |
| CaO | 3.1 | |
| $Na_2O$ | 0.1 | |
| MgO | 0.2 | |
| NiO | 5.9 | |
| Total | 105.7 | |

The catalyst, designated as DB′, was also diagnosed as a bad catalyst in a diagnostic hydrocracking test, as indicated by 50 percent hydrogenation of benzene and >90 percent hydrogenolysis of iso-hexane.

EXAMPLE 2

Fifty grams of ore lot D were heated in 250 ml. of $NH_4NO_3$/DMSO solution (containing 400 grams of anhydrous $NH_4NO_3$ per liter of DMSO, about 8.3 equiv. $NH_4^+$ per gm. atom Al) for three days at 125° C. The catalyst was filtered, and the procedure repeated for a total of three times. The final product (no washing) was

---

[1] Handbook of Chemistry, 10th ed., 1961, McGraw-Hill.

[2] This ore lot (D) has been identified as the most unsatisfactory source, and catalysts prepared by previously published methods cause temperature runaway in CT Units. Its composition is described in Table 1 below. X-ray diffraction data show the presence of about 40% of amorphous material in the composite. Analyses of visually separated fractions of erionite and amorphous material do not show significant differences in their chemical composition.

dried in air at 125° C. and designated D-2. Available composition data are shown in Table 1.

TABLE 1.—DMSO/NH₄ PLUS ERIONITE

|  | D, wt. percent | Equiv./g. atom Al | D-2, wt. percent | Equiv./g. atom Al |
|---|---|---|---|---|
| SiO₂ | 68.4 | | | |
| Al₂O₃ | 16.2 | | 14.9 | |
| Fe₂O₃ | 2.7 | | 0.8 | |
| K₂O | 4.4 | .29 | 3.3 | .24 |
| Na₂O | 4.7 | .48 | 0.0 | .10 |
| CaO | 2.0 | .22 | | |
| MgO | 1.3 | .20 | | |
| Total | | 1.10 | | .34+ |

Iron, an occluded impurity, previously remaining intact in aqueous media (except in strong mineral acids) was substantially removed by DMSO; although no calcium and magnesium data were available, the reduction in sodium indicated that singificant amount of ion exchange with $NH_4^+$ had been achieved.

Ten grams of air dried D-2 was refluxed for ten minutes in 500 ml. of boiling 0.5 N Ni acetate solution (~8.3 equivalents Ni/gm. atom Al) and filtered while hot. The catalyst was then slurried in 150 ml. of water at room temperature, stirred for 30 minutes and filtered. The final product was air dried at 140° C. and designated D-3. Available composition data are shown in Table 2 and conversion data in Table 3.

TABLE 2.—COMPOSITION OF D-3

|  | Weight percent analyzed | Equiv./g. atom Al | |
|---|---|---|---|
|  |  | Based on 12.8% Al₂O₃ | Based on 16.2% Al₂O₃ |
| Al₂O₃ | 12.8 | | |
| Fe₂O₃ | 0.6 | | |
| K₂O | 3.1 | .26 | .21 |
| Na₂O | 1.2 | .15 | .12 |
| NiO | 7.6 | .81 | .64 |
| Total | | 1.22+ | .97+ |

EXAMPLE 3

Five hundred fifty grams of hammer milled erionite ore lot D was heated with stirring at 200° F. in 7050 ml. of 5 N NH₄Cl solution for 24 hours (about 26 equiv. NH⁺ g. atom Al). The slurry was filtered and the treatment was repeated with fresh solution for 4 hours, filtered and washed essentially chloride free. The final product was dried at 230° F. and designated D-4A.

One hundred and thirteen grams (100 gms. solid) of D-4A erionite was dispersed in 350 ml. of DMSO, heated to and held at 150° C. for 24 hours and filtered. The product was washed twice with 350 ml. of water at room temperature and dried at 230° F. It was then exchanged with 920 ml. of 0.5 N Ni acetate solution (1.53 eq. per gm. atom Al) for 10 minutes at 200° F. The catalyst was washed free of nickel with water, dried at 230° F., pelleted and sized to 14/25 mesh, and dehydrated in air at 1000° F. for 10 hours. The catalyst designated as D-4 contains 2.1 percent Ni (.23 eq./g. atom Al). See Table 3 for conversion data.

EXAMPLE 4

(A) 60 grams of zeolite T were exchanged with 5.0 N ammonium chloride solution, dried and exchanged with 5 N nickel acetate for 10 contacts, with a drying step between each contact. The resultant catalyst, identified as D-5, contained 7.0 percent nickel.

(B) The catalyst of 4A above (D-5) was exchanged with another portion of a 5 N nickel acetate and dried. It now contained 7.2 percent nickel. To 3 grams of D-5 was added 100 ml. of DMSO, which mixture was then stirred with heating at 150° C. for 6 hours. The resultant product was filtered, washed with 300 ml. water, and dried at 110° C. Calcined at 510° C. for 20 hours. This catalyst was identified as D-6. It contains 0.4 wt. percent sulfur.

Catalytic conversion test results for the catalysts D-5 and D-6 are shown in Table 3.

TABLE 3

[Test conditions: 200 p.s.i. pressure, 15/1 molal ratio H₂HC, 4LHSV (1:1:2 weight ratio mixture of 2-methylpentane:n-n-hexane:benzene)]

|  | At 700° F. | | | | At 900° F. | | | |
|---|---|---|---|---|---|---|---|---|
|  | Paraffins cracked, (weight percent) | | Benzene converted, (weight percent) to— | | Paraffins cracked, (weight. percent) | | Benzene converted, (weight. percent) to— | |
|  | 2-methyl pentane | n-Hexane | Cyclo-paraffins | Cracked products | 2-methyl pentane | n-Hexane | Cyclo paraffins | Cracked products |
| D-B | 6 | 25 | 65 | Nil | 91 | 95 | 1 | 47 |
| D-B' | Nil | 23 | 50 | 5 | 53 | 94 | 1 | 33 |
| D-3 | 2 | 31 | 10 | 3 | 27 | 86 | 4 | 4 |
| D-4 | 3 | 90 | Nil | 4 | 9 | 95 | Nil | 6 |
| D-5 | Nil | 17 | 35 | 6 | 81 | 96 | 1 | 36 |
| D-6 | 3 | 31 | 1 | Nil | 29 | 88 | Nil | 7 |

Catalysts prepared by the procedures of Examples 2 and 3 and 4(B) are classified as "acceptable" according to the diagnostic hydrocracking test, while catalysts prepared according to Examples 1 and 4(A) are "unacceptable" catalysts. The "acceptable" catalysts are characterized under the diagnostic test conditions by the following criteria:

(1) They have low aromatics hydrogenation activity under hydrogenative conditions (700° F., 200 p.s.i.g.) however have sufficient hydrogenation activity to carry out shape selective hydrocracking reactions of n-paraffins.

(2) They do not have significant metal cracking activity to crack aromatics cycloparaffins and branched chain paraffins under dehydrogenative conditions (900° F., 200 p.s.i.g.). Catalyst D-4 is particularly superior in low hydrogenation activity for benzene and high shape selectivity factor. (See Table 3 for detailed test data, also serving as examples of the invention.) Example 4 further demonstrates the present invention can effectively convert unacceptable catalysts to acceptable catalysts. These examples further illustrate that the use of DMSO, either in one of the exchange steps or in between aqueous exchanges, is effective in converting a "bad" ore to "acceptable" catalysts. At present, there can be offered a number of plausible suggestions to the nature of the role DMSO plays in this regard:

(a) The external surface sites, whether amorphous or crystalline, after exposure to DMSO or NH₄NO/DMSO lose their sorption or exchange capacity for nickel ions. There is evidence that DMSO molecules are strongly held by the solid despite thorough washing with water and are removed at the calcination step.

(b) DMSO deactivates the hydrogenation activity of the undesirable metal sites present on the exterior surface of the catalysts.

The following table, also serving as examples of the invention, present data on the addition of several other sulfur compounds to ore lot D (Example 1) both in the Ni/NH₄ form and in the Ni/H form, together with conversion data using the resulting catalysts.

TABLE 4.—ADDITION OF SULFUR TO SHAPE SELECTIVE CATALYST PREPARED FROM ORE LOT D

| | | | | | | | Addition of 2% sulfur to Ni/H-form | | | |
| | | | | | | |---|---|---|---|
| | | | | | | | Flowers of sulfur | | Ammonium sulfide | |
| Sulfur compound | Blank, none | Sodium sulfide | Sulfuric acid | Thiophene | Butyl mercaptan | Dimethyl sulfoxide | Uncalcined | Calcined | Uncalcined | Calcined |
|---|---|---|---|---|---|---|---|---|---|---|
| S in catalyst, percent wt.: | | | | | | | | | | |
| Dried or uncalcined | | 1.87 | 1.44 | <0.03 | 0.08 | 0.71 | 1.83 | 1.83 | 1.17 | 1.17 |
| Calcined | | 1.95 | 1.25 | 0.04 | 0.11 | 0.42 | | 0.42 | | 0.71 |
| Spent | | 1.89 | 0.37 | (¹) | 0.11 | 0.25 | 0.23 | 0.30 | 0.28 | 0.39 |
| Screening test: | | | | | | | | | | |
| n-C₆ conversion, percent wt | 100 | 55.0 | 53.0 | | 89.2 | 69.4 | 71.8 | 65.0 | 53.0 | 55.0 |
| i-C₆ conversion, percent wt | 100 | 12.6 | 7.6 | | 57.6 | 20.0 | 19.6 | 15.2 | 9.2 | 7.6 |
| Selectivity factor | Indet. | 5.9 | 9.8 | | 2.6 | 5.3 | 5.7 | 6.4 | 7.8 | 10 |
| Gas factor | 0.0 | 6.1 | 5.1 | | 2.8 | 7.5 | 8.9 | 7.6 | 8.3 | 5.8 |
| Temperature rise, °F | 30 | | | 45 | | | | | | |
| Product dist., percent wt.: | | | | | | | | | | |
| Paraffins: | | | | | | | | | | |
| C₁ | 88.8 | 1.1 | 1.2 | | 9.6 | 1.2 | 1.0 | 1.0 | 0.7 | 1.1 |
| C₂ | 9.8 | 3.5 | 3.6 | | 6.3 | 3.8 | 3.3 | 3.4 | 2.5 | 3.3 |
| C₃ | 1.4 | 23.5 | 20.3 | | 34.4 | 32.6 | 33.5 | 28.6 | 22.7 | 21.1 |
| C₄ | | 4.2 | 4.0 | | 8.5 | 4.9 | 4.7 | 4.6 | 3.6 | 4.2 |
| C₅ | | 0.5 | 0.4 | | 5.4 | 0.6 | 0.8 | 0.7 | 0.2 | 0.5 |
| iso-Paraffins: | | | | | | | | | | |
| C₄ | | 0.1 | | | 1.5 | | | | | |
| C₅ | | 0.2 | | | 5.8 | 0.3 | 0.3 | 0.3 | | 0.1 |
| DMB's | | 0.5 | 0.4 | | 2.0 | 1.2 | 2.1 | 1.6 | 1.4 | 0.7 |
| 3-MP | | 2.1 | 2.3 | | 7.6 | 5.4 | 9.3 | 7.3 | 4.6 | 4.3 |
| Olefins: | | | | | | | | | | |
| C₂ | | | | | | | | | | |
| C₃ | | 0.4 | 0.3 | | | 0.2 | 0.1 | 0.1 | 0.2 | 0.2 |
| C₄ | | | | | | | | | | |
| Remarks | 5.6% NiO | (³) | (³) | (³) | (³) | (³) | (²) | (²) | (³) | (³) |

¹ Run terminated after 6 minutes due to high temperature rise.
² Dry mix.  ³ Wet mix.

What is claimed is:

1. A method for preparing an improved shape selective hydrocracking catalyst composition from a crystalline aluminosilicate having a silicon to aluminum atomic ratio of at least 1.8 and a pore size of about 5 angstrom units, which comprises contacting said crystalline aluminosilicate with dimethylsulfoxide, followed by contact with an aqueous exchange solution of a transition metal in cationic form, said transition metal being selected from the Group VIII elements of the Periodic Table and recovering the resultant cation exchanged product.

2. A method according to claim 1 wherein said crystalline aluminosilicate is erionite.

3. A method according to claim 2 wherein said contact with dimethylsulfoxide is followed by water washing and drying of the resultant dimethylsulfoxide contacted erionite.

4. A method according to claim 2 wherein said crystalline aluminosilicate is an erionite ore.

5. A method according to claim 2 wherein said crystalline aluminosilicate is zeolite T.

6. A method for preparing an improved shape selective catalyst composition from a crystalline aluminosilicate having a silicon to aluminum atomic ratio of at least 1.8 and a pore size of about 5 angstrom units which comprises initially contacting said crystalline aluminosilicate with dimethylsulfoxide and thereafter with an aqueous exchange solution of a transition metal in cationic form, said transition metal being selected from the Group VIII elements of the Periodic Table and recovering the resultant cation exchanged product.

7. A method for preparing an improved shape selective catalyst composition from a crystalline aluminosilicate having a silicon to aluminum atomic ratio of at least 1.8 and a pore size of about 5 angstrom units which comprises initially contacting said crystalline aluminosilicate with dimethylsulfoxide and thereafter with an impregnating medium of a transition metal selected from the Group VIII elements of the Periodic Table and recovering the resultant product.

References Cited

UNITED STATES PATENTS 3,213,155  10/1965  Schriesheim _____ 260—683.15
3,331,767  7/1967   Aray et al. _____ 208—111
3,509,042  4/1970   Miale et al. _____ 208—120

CURTIS R. DAVIS, Primary Examiner

U.S. Cl. X.R.

208—111, 120, 138

PO-1050
(5/69)

UNITED STATES PATENT OFFICE
CERTIFICATE OF CORRECTION

Patent No. 3,630,966           Dated December 28, 1971

Inventor(s) Nai Yuen Chen and Edward J. Rosinski

It is certified that error appears in the above-identified patent and that said Letters Patent are hereby corrected as shown below:

Column 5, line 10           "0.0" should read --0.9--
(column 4 of Table 1)

Column 6, line 30           "6" should read --5--
(column 5 of Table 3)

Column 6, line 62           "$NH_4NO/DMSO$" should read --$NH_4NO_3/DMSO$--

Signed and sealed this 30th day of May 1972.

(SEAL)
Attest:

EDWARD M. FLETCHER, JR.           ROBERT GOTTSCHALK
Attesting Officer           Commissioner of Patents